United States Patent [19]

Spontelli

[11] 3,810,296

[45] May 14, 1974

[54] METHOD OF SWAGING AND TESTING FERRULES

[75] Inventor: Leonard P. Spontelli, Seven Hills, Ohio

[73] Assignee: Crawford Fitting Company, Solon, Ohio

[22] Filed: Nov. 20, 1972

[21] Appl. No.: 308,247

Related U.S. Application Data

[62] Division of Ser. No. 134,229, April 15, 1971, Pat. No. 3,728,771.

[52] U.S. Cl.................................. 29/407, 29/520
[51] Int. Cl............................................. B23q 17/00
[58] Field of Search.......... 29/237, 200 B, 282, 520, 29/407

[56] References Cited
UNITED STATES PATENTS

| 2,333,120 | 11/1943 | Parker | 29/237 |
| 2,381,748 | 8/1945 | Howe | 29/520 UX |
| 2,402,723 | 6/1946 | Bean | 29/407 X |
| 2,427,685 | 9/1947 | Midtlying et al. | 29/407 |
| 3,156,284 | 11/1964 | Stanley | 29/282 |
| 3,201,859 | 8/1965 | Stanley | 29/237 |
| 3,255,521 | 6/1966 | Callahan | 29/407 |

Primary Examiner—Charlie T. Moon
Attorney, Agent, or Firm—Fay, Sharpe and Mulholland; Daniel G. Blackhurst

[57] ABSTRACT

Method and apparatus for swaging one or more ferrules on the periphery a cylindrical member such as a tube and for testing the integrity of the grip by the ferrules on the tube following a swaging operation. The apparatus shown in the drawings includes power actuated camming means for engaging the ferrules and forcing them radially inwardly into engagement with the tube while means cooperate therewith to prevent longitudinal movement of the ferrules. Additionally, testing means are provided for testing the integrity of the swaging operation including means for applying a predetermined longitudinally directed force against an end of the tube while the ferrules are held to determine whether or not the tube will move relative to the ferrules.

8 Claims, 5 Drawing Figures

METHOD OF SWAGING AND TESTING FERRULES

This is a division of application Ser. No. 134,229, filed Apr. 15, 1971, now U.S. Pat. No. 3,728,771.

The subject invention is directed toward the art of joints and couplings and, more particularly, to a method and apparatus for applying ferrules to cylindrical members and testing the application of the ferrules.

The invention is especially suited for use in applying or pre-swaging the ferrules of swage-type tube fittings and will be described with particular reference thereto; however, as will become apparent, the invention is capable of broader application and could be used for applying and testing ferrules for many purposes.

The use of swage-type tube or pipe fittings has become very widespread. These fittings generally involve the use of one or more ferrules which encircle the tube to be coupled, and which are progressively deformed into gripping and sealing engagement with the tube by the interaction of a coupling nut and a fitting body. Previously, the use of such fittings has primarily been limited to the smaller diameters. The reason for this is that as the diameter of the fitting increases, or as the hardness of the pipe and fitting material increases, the force required to effect swaging of the ferrules increases. Thus, the force or torque required can become greater than that which can be conveniently applied manually to the coupling nut. Consequently, power actuated ferrule setting or pre-swaging devices have been proposed. These devices contemplate the attachment of the ferrules to the tube prior to make-up of the fitting.

The typical prior art power actuated devices have been somewhat cumbersome and have required die blocks and the like for engaging the ferrules and cooperating with a die member to perform the swaging operation. Additionally, none of the prior art devices provide a positive means for indicating the completion of a swaging operation. Similarly, none of the prior art devices provide means for testing or checking the adequacy of the swaging operation.

The subject invention overcomes the noted disadvantages and deficiencies of the prior art devices and provides a setting method and apparatus which is simple and reliable. Apparatus formed in accordance with the invention allows the adequacy of the joints between ferrules and the tubes to be checked or tested.

In accordance with one aspect, the invention contemplates a ferrule setting and testing apparatus comprising camming means for engaging a ferrule or ferrules positioned adjacent the end of a tube or other cylindrical member on which it is to be swaged, and means including power means for applying a force to the ferrule to cause it to be driven into engagement with the camming means, thus to deform the ferrule into gripping and sealing engagement with the cylindrical members. Associated with the camming means are means for applying a predetermined force to the end of the cylindrical member to attempt to produce relative movement between the ferrule and the cylindrical member following a swaging operation.

It has been found that if the ferrule and cylindrical member do not have relative movement when placed under certain predetermined loads acting to move them in opposite directions, then the swaging operation is satisfactory. This is particularly advantageous when installing ferrules for tube or pipe fittings since it provides a rapid check of the adequacy of the ferrule swaging, which is in turn an indication of the holding power and fluid tightness of the fittings.

In accordance with a more limited aspect of the invention, the apparatus includes concentric, axially aligned pistons. One piston carries the camming means and the other is arranged to act against the end of the cylindrical member. Power means are provided so each of the pistons can be separately actuated.

By the arrangement of the pistons, the apparatus can be made extremely compact. Further, each of the pistons can be operated from a common power source and the entire assembly readily transported for field use.

Accordingly, a primary object of the invention is the provision of a ferrule setting apparatus incorporating means for testing the adequacy of the ferrule setting operation.

A further object of the invention is the provision of an apparatus of the type described which tests the strength of the swaged connection made between the ferrules and an associated tube or other cylindrical member.

Another object of the invention is the provision of an apparatus of the type discussed wherein the ferrule setting and testing is accomplished by concentric piston members.

Still another object is the provision of a ferrule setting device which is simple to operate and which can, without repositioning, test the strength of the setting operations.

These and other objects and advantages will become apparent from the following description when read in conjunction with the accompanying drawings wherein.

Figure 1:
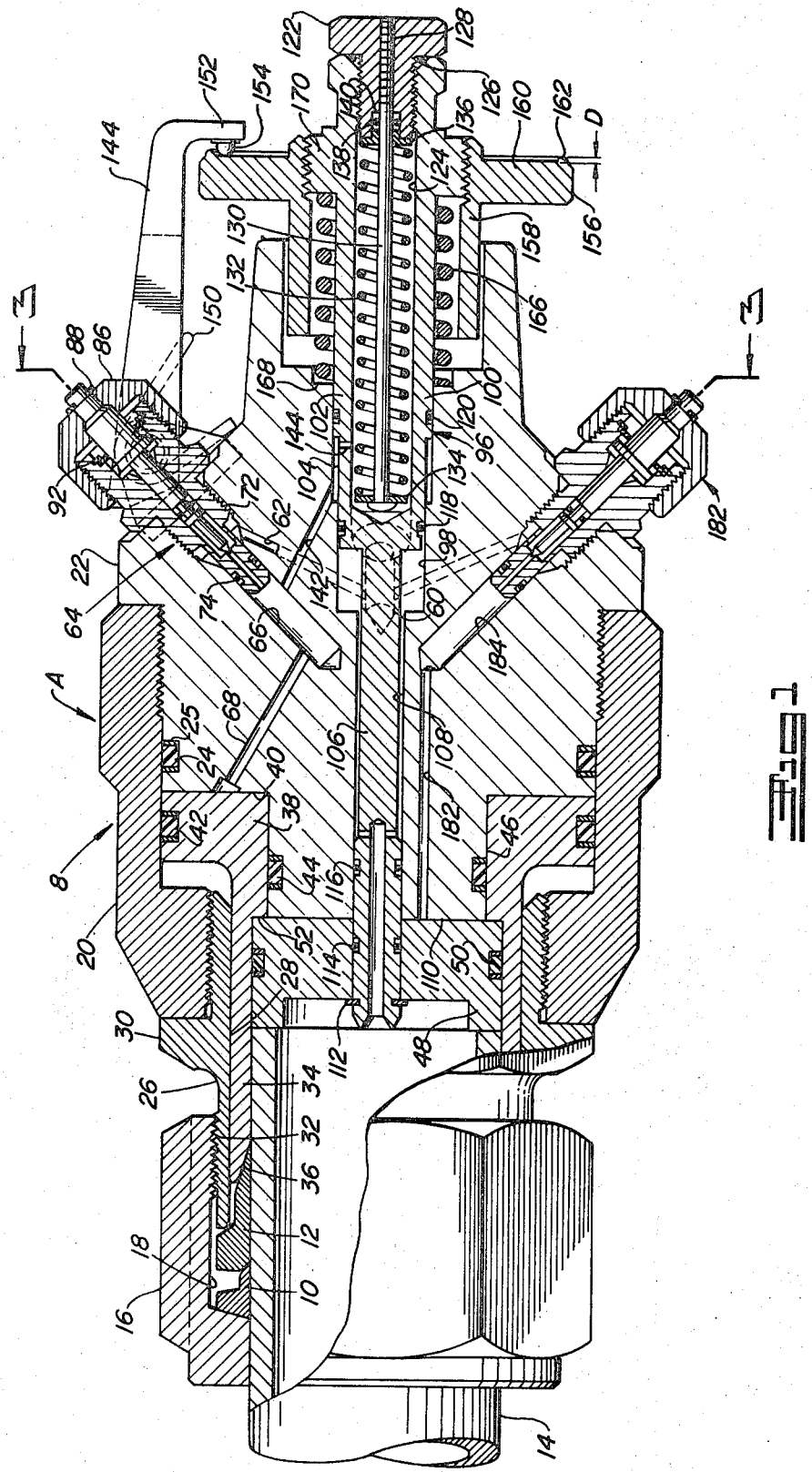
FIG. 1 is a longitudinal cross-sectional view through the preferred embodiment of a ferrule setting and testing apparatus formed in accordance with the invention.

Referring in particular to FIG. 1, the ferrule setting and testing apparatus A is illustrated as being used to swage a pair of ferrules 10 and 12 to the outer peripheral surface of a pipe or tube 14. In the particular embodiment shown, the ferrules 10 and 12 are of the type used in a tube fitting such as that shown in U.S. Pat. No. 3,103,373 issued Sept. 10, 1963; however, it is to be appreciated that the specifics of the ferrules or their use is not critical to the present inventive concept.

The member 16 is the coupling nut component of the fitting into which tube 14 is ultimately to be received. Nut 14 has a threaded opening 18 which surrounds both the ferrules 10 and 12 and the end portion of tube 14.

Although the setting and testing apparatus itself could have many forms, it is shown as including a main body 8 comprising a first generally cylindrical member 20 which is threadedly connected at its right end (as viewed in FIG. 1) to a body member 22. A suitable seal ring 24 is positioned in a groove 25 formed in body member 22 to provide a fluid tight seal between the members 20 and 22.

Threadedly attached to the left-hand end of member 20 is a sleeve-like connecting member 26 having a circular inner bore 28. A flange portion 30 extends outwardly from the member 26 for engagement with the end of member 20. The left-hand end of the sleeve-like member 22 is provided with threads 32 adapted to mate with the threads of opening 18 in coupling nut 16.

Carried within the body 10 and mounted for reciprocal movement therein is a cylindrical sleeve-like member 34 which terminates at its outer end in an inclined camming or mouth surface 36. The mouth surface 36 is continuous about member 34 and is contoured so as to engage the nose portion of the ferrule 12 and swage it inwardly against the outer periphery of the pipe 14 when the sleeve member 34 is actuated outwardly relative to member 26.

Many types of power means could be used for actuating the sleeve member 34; however, in the illustrated embodiment, the power means include a first piston member 38 which is formed integrally on the inner end of the sleeve member 34. As shown, the piston member 38 is of annular configuration and is slidably received in a recess 40 formed circumferentially about the inner end of member 22. A piston ring member 42 is carried in an annular groove in the outer periphery of the piston member 38 to provide a fluid tight seal with the inner wall of the sleeve member 20. Additionally, a seal member 44 is carried in an annular groove provided in the reduced diameter portion 46 of member 22.

As can be appreciated, actuation of piston member 38 outwardly relative to the body 8 will cause the camming mouth 36 of sleeve 34 to engage the nose portion of the ferrule 12. The continual outward movement of the camming mouth 36 relative to the coupling nut 16 causes the ferrules to be swaged onto the tube 14.

In addition to the ferrule swaging operation, the preferred embodiment also is adapted to perform a test operation. For this reason, a second piston member 48 is positioned within the sleeve member 34 and mounted for reciprocation relative thereto. The piston 48 is of a diameter substantially equal to the diameter of the pipe 14 and is received closely within the sleeve 34. A piston ring member 50 carried within an annular groove about the periphery of piston 48 establishes a seal with sleeve 34. It will be noted that a shoulder 52 is formed inwardly of sleeve 34 between the inner end of the sleeve and the piston member 38. Accordingly, relative movement of the piston 38 outwardly causes simultaneous movement of the piston 48.

Figure 2:
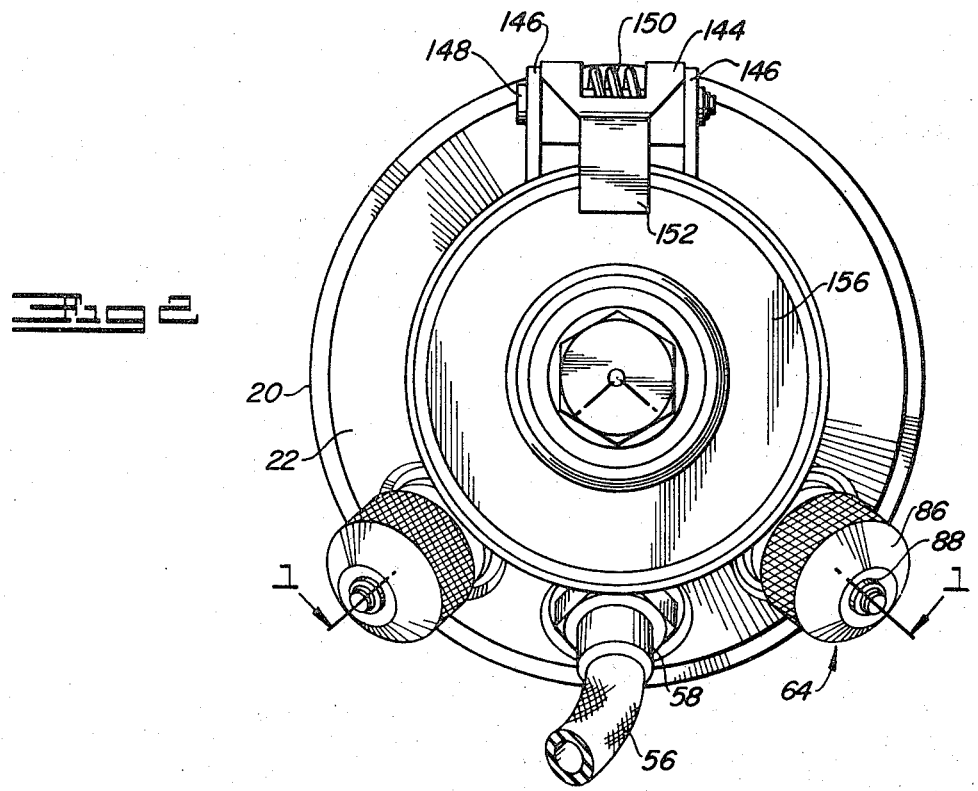
FIG. 2 is a right end view of the apparatus shown in FIG. 1; (It will be noted that the dash-dot line identified with the numeral 1 in FIG. 2 shows the manner in which the longitudinal cross-sectional view of FIG. 1 is taken)
Figure 3:
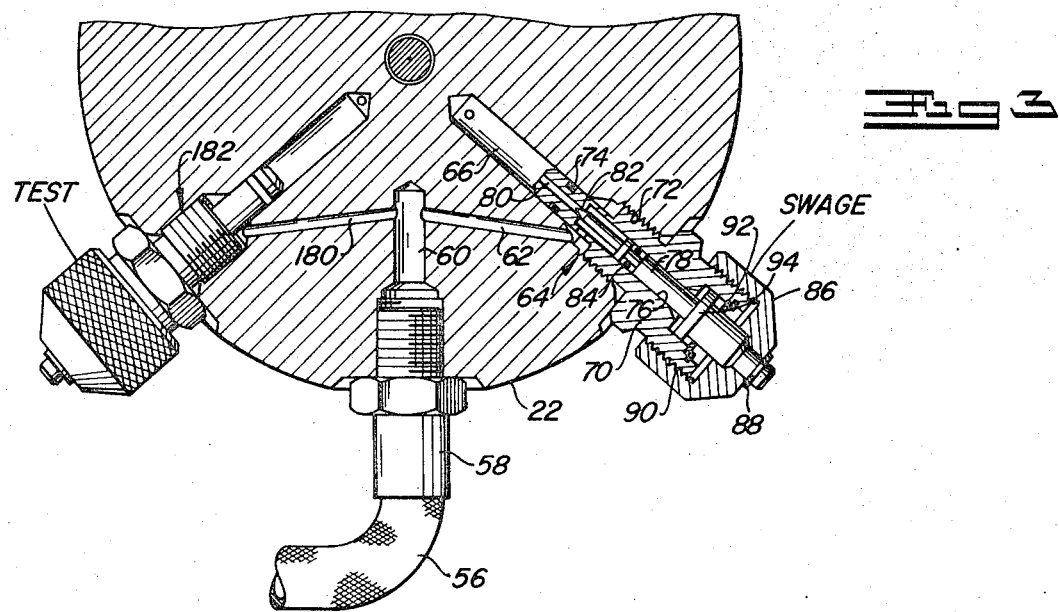
FIG. 3 is a cross-sectional view taken on line 3—3 of FIG. 1.
Figure 4:
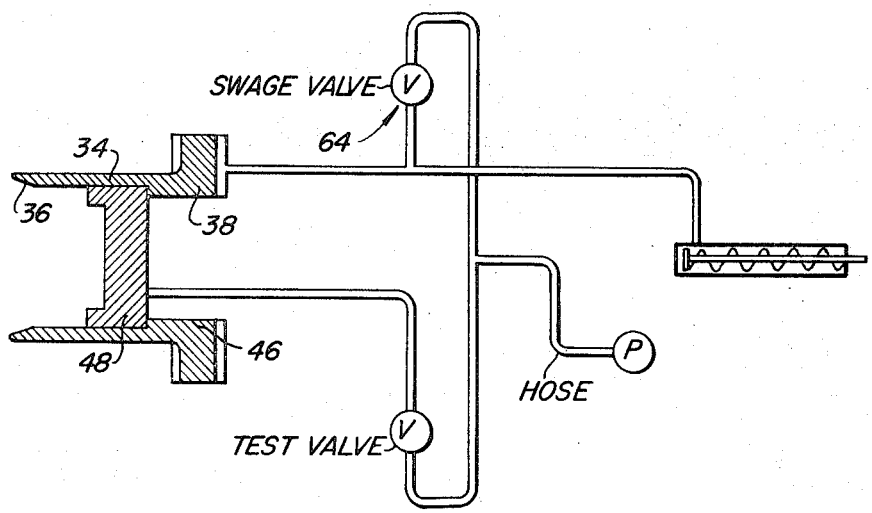
FIG. 4 is a diagrammatic illustration of the hydraulic circuit of the apparatus of FIG. 1; and, FIG. 5 is a longitudinal cross-sectional view through an apparatus arranged for testing the adequacy of the ferrule swaging.

The piston 48 is arranged to be actuated outwardly of the sleeve 34 independently of the movement of piston 38. Although many types of power means could be utilized for actuating piston 48, the preferred embodiment utilizes a hydraulic system which is common to both piston 48 and piston 38. As best shown in FIGS. 2 and 4, a flexible hydraulic fluid supply line 56 is connected with the body member 22 by a fitting 58. The hose 56 can be connected to any source of hydraulic pressure such as, for example, a standard manually operated hydraulic pump 59 (illustrated diagramatically in FIG. 5). In the embodiment shown, the fitting 58 is connected through an inlet bore 60 and a feed passage 62. Passage 62 is connected through a valve assembly 64 with bore 66. As best shown in FIG. 1, the bore 66 is connected through a line 68 to a point behind the piston 38. It should be noted that the recess 40, in combination with the sleeve member 20, defines a fluid tight cylinder. Thus, by controlling the supply of hydraulic fluid to the cylinder, the force exerted by piston 38 and the camming mouth 36 can be regulated.

The particular form of valve assembly utilized for controlling the flow of hydraulic fluid to the piston 38 is not of importance to the invention; however, it will be noted that the valve assembly 64 comprises a body portion 70 which is threadedly received in opening 72 formed at the outer end of bore 66. An O-ring seal member 74 is received about the inner end of body 70 and seals between the body and the bore 66. A valve member receiving bore 76 extends longitudinally through body 70 and slidably receives a valve member 78. It will be seen that the bore 76 has a reduced diameter end portion 80 which defines a seat 82. The inner end of valve member 78 is preferably tapered as shown for sealing engagement with the valve seat 82.

Positioned about the valve member 78 is an O-ring 84 which functions to prevent fluid flow outwardly of the valve member. Means for actuating the valve member 78 comprise a knurled handle member 86 which is connected to the outer end of the valve member 78 by a snap ring 88. The knurled nut member 86 is threaded on the body 70 as shown at 90. As can be appreciated, by rotation of the knurled nut 86, the position of the valve member 78 can be adjusted to open and close the valve. Outward movement of the valve member 78 is limited by a shoulder 92 formed by a pair of snap rings. The shoulder 94 on the valve member 8 serves to engage with the snap rings to prevent outward movement of the valve member.

The subject device also includes means for indicating the pressure within the cylinder and, also, means for indicating the degree of relative movement which has taken place between the camming mouth 36 and the coupling nut 16. The means for indicating the pressure within the cylinder comprise an indicator assembly 96 carried within an axial bore 98 formed in body 22. The indicator assembly 96 includes a first elongated housing 100 which is of stepped diameter and has two first enlarged diameter portion 102 and 104 which are slidably received in bore 98. A smaller diameter end portion 106 of the housing 100 extends inwardly through a reduced diameter opening 108 formed in the body 22. The opening 108 extends between the end face 110 of the body 22 and the inner end of axial bore 98.

The piston 48 is connected to the outer end of the housing 100 so that outward movement of the piston produces a corresponding movement of the housing. In this respect, it will be seen that the piston is connected to the end portion 106 of housing 100 by a snap ring 112. Additionally, suitable O-rings 114 and 116 provide a fluid seal about the end portion 106 of housing 100. Similar O-rings 118 and 120 are carried by the enlarged diameter portions 102 and 104 of body 100.

Threadedly received in the outer end of housing 100 is a cap member 122 which is sealed relative to axial bore 124 of the housing by a seal ring 126. Extending inwardly of bore 124 and slidably received in an opening 128 formed through the cap member 122 is an indicator pin 130. The pin 130 is maintained under an inwardly directed bias by a coil spring 132 which is positioned between a flange or washer member 134 carried at the inward end of pin 130, and a shoulder formed by a washer member 136 carried on the cap member 122. An O-ring 138 is mounted between the washer 136 and the inner end of the opening 140. As mentioned, the indicator assembly 96 provides an indication of the pressure acting against piston 38. This is accomplished by means of a flow passage 142 which extends from passage 62 to the bore 98. A small port 144 communicates the bore 98 with the internal bore 124 of body 100. Accordingly, the hydraulic fluid supplied to the piston 38 is also conducted through the passage 142 and the port 144 to the interior of the housing 100. The hydraulic pressure built up in bore 124 thus acts to force the indicator pin 130 outwardly against the bias of spring 132. It will be noted that the outer end portion of indicator pin 130 is provided with spaced, scribed lines which provide a means for ascertaining the magnitude of the pressure acting against the pin.

The present embodiment also includes the distance indicator which gives a positive signal when the proper amount of movement has taken place between the cam member and the body 10. The particular indicator arrangement shown is the subject of a separate, commonly assigned U.S. Patent Application, Ser. No. 134,155 for "Ferrule Setter with Indicator Means" filed concurrently herewith.

In particular, the indicator preferably comprises a spring biased indicator arm 144 which is pivotally connected to the body portion 22 by a pair of legs 146 and a pivot pin 148. A coil spring member 150 is positioned between a bifurcated end portion of the lever arm 144 and has opposite end portions engaging the lever arm and the body respectively. Normally, the arm is maintained under a continual outward bias in a counterclockwise direction, (as viewed in FIG. 1) by the spring 150. The outer end of the arm 144 is bent downwardly as shown at 152 and is provided with a protuberance 154. Arranged to cooperate with the protuberance 154 is a gauge member 156 which includes a sleeve-like body portion 158 that is adjustably received on the housing 100 of the indicator assembly 96. The outwardly extending flange portion 160 of the gauge 156 includes a lip portion 162 having a closely controlled height D.

In operation, the flange 160 and the outward extending flange portion 162 cooperate to maintain the indicator arm 144 in the solid line position until a predetermined degree of movement takes place of the camming mouth 36 relative to coupling nut 16. In the connection, note that the protuberance 154 extends under the flange 162 and prevents upward movement of the arm 144. It should also be noted that the housing portion 100 of the indicator assembly 96 is continually biased in an outward direction by a heavy coil spring 166 which extends between the internal shoulder 168 and the enlarged diameter threaded portion 170 of housing 100.

The operation and use of the apparatus thus far described will now be explained. First, the coupling nut member 16 is passed over the end of the tube 14, and the two ferrules 10 and 12 are positioned about the tube in their approximate required location. The coupling nut 16 is then hand tightened onto the threaded portion 32 of the sleeve 28. At this time, the assembly will be in the position shown in FIG. 1. With the nut firmly hand tightened, hydraulic fluid is supplied to the cylinder chamber behind piston 38 which causes the nut 16 and the camming mouth 36 to be driven toward one another to swage the ferrules 10 and 12 radially inwardly into engagement with the tube. As the relative motion takes place between the piston member 38 and the body 22, the piston 48 is also moved away from body 22. This causes the indicator housing 100 to be moved to the left pulling the gauge member 156 therewith. When the housing 100 has moved to the left a distance equal to the distance D, the arm 144 is released, swinging upwardly and indicating that the required swaging action has been completed. Simultaneously, with the application of the hydraulic pressure to cylinder 38, the indicator pin 130 is driven outwardly indicating the amount of pressure present acting against the piston.

When the swaging operation is complete, valve 64 is closed. Valve 182 is then opened to apply pressure to test piston 48. The pressure applied is indicated for example, on a pressure gauge associated with the manually operated hydraulic pump. It should be understood however, that other types of indicators could be used during the test operation.

Figure 5:
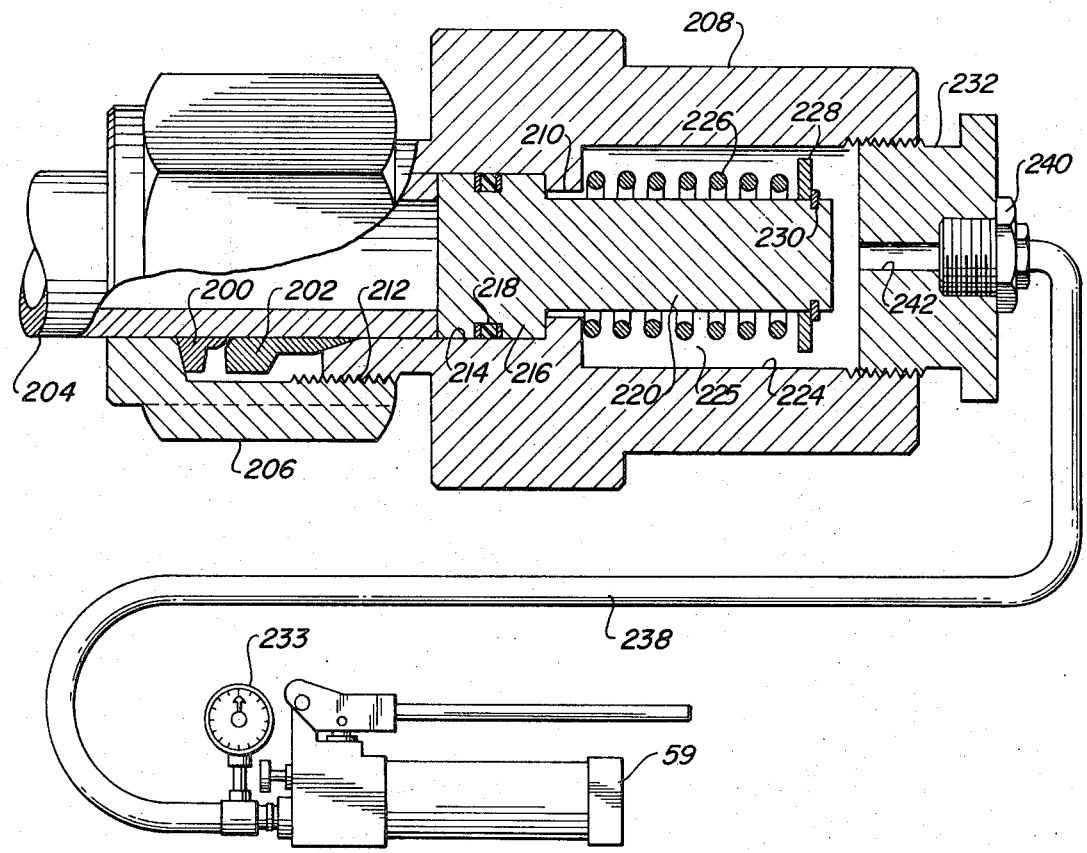

As is apparent, the apparatus could be arranged to perform only swaging or only testing. FIG. 5 illustrates an apparatus which is designed to perform only testing. This apparatus can be used when the ferrules have been applied either manually or through the use of a power actuated swaging device. The tester shown in FIG. 5 is arranged to engage the coupling nut of the fitting and to apply an end thrust to the tubing to determine whether or not relative movement can take place between the ferrules and the tubing under a certain predetermined end load. Normally, the end thrust which must be carried will be determined empirically for each of a variety of types or sizes of fittings so that the operator will know what end thrust the fitting must be capable of withstanding.

In the embodiment shown, the ferrules 200 and 202 are shown swaged on the pipe or tubing 204 with the coupling nut 206 of the fitting surrounding the ferrules at the normal location. The testing apparatus itself comprises a main body 208 having a longitudinally extending bore 210. The left-hand end of the body 208 is of reduced diameter and provided with threads 212 adapted to threadedly connect the body 208 with the female body member 206 of the fitting. The internal periphery of the outer left end of bore 210 is shaped so as to engage the tapered outer end of the fitting 202. As can be seen, the left-hand end of bore 210 is counterbored 214 to a diameter which will closely receive the end of the pipe 204.

Positioned within the counterbore 214, is a piston 216 provided with a circumferentially extending piston ring 218. The piston 216 includes a piston rod portion 220 which extends to the right in bore 210 into an enlarged counterbore portion 224. Normally, the piston is maintained under a constant bias to the right (as viewed in FIG. 5) by a coil spring 226 which extends between the shoulder or bottom of counterbore 224 and a retaining or thrust washer 228 connected to the end of the piston 220 by snap ring 230. A plug member 232 is threadedly received in the outer end of the counterbore portion 224 to provide a closed chamber 225.

By supplying pressurized fluid to the chamber 225, the piston can be placed under a predetermined force acting to move it outwardly of the counterbored section 214 relative to body 208. This will thus cause the pipe to be placed under an end thrust acting to move it relative to the ferrules and out of the female fitting 206. The particular manner in which the pressurized fluid is supplied to the chamber is not of importance to the invention; however, preferably, a conventional manually operated hydraulic pump 59 is connected with the counterbored chamber 224 by a flexible line 238 and a fitting 240 which is received in the outer end of a bore 242 in the member 232. The pump preferably includes a pressure gauge 233 to indicate the force acting within chamber 225.

To utilize the device for a testing operation, it is assembled on the previously swaged ferrules in the manner shown in FIG. 5. Thereafter, the pump 59 is operated to build up a predetermined hydraulic pressure within the counterbore 224. The level of pressure which the fitting must withstand has, of course, been previously determined from laboratory experimentation. If the fitting can withstand the end thrust applied, the ferrules have been satisfactorily swaged. This gives a simple, rapid check of the fitting prior to placing it under fluid pressure.

The invention has been described in great detail sufficient to enable one of ordinary skill in the art to make and use the same. Obviously, modifications and alterations of the preferred embodiment will occur upon a reading and understanding of the specification and it is my intention to include all such modifications and alterations as part of my invention insofar as they come within the scope of the appended claims.

What is claimed is:

1. A method swaging a ferrule onto the periphery of a tube or rod and testing the strength of the swaged connection comprising,
   mounting a nut and a ferrule over the end of a tube or rod,
   inserting the end of the tube or rod into a swaging and testing tool,
   connecting the nut to the tool to (a) align the tube or rod with a camming mouth within the tool and (b) limit the axial movement of the ferrule,
   applying a first force to cause relative movement between the ferrule and camming mouth to swage the ferrule inward into tight engagement with the periphery of the tube or rod,
   applying a second force against the inner end of the tube while the nut is connected to the tool to test the strength of the swaged connection.

2. The method of claim 1, including measuring the magnitude of the second force applied against the inner end of the tube or rod.

3. The method of claim 2, including terminating the relative movement of the ferrule and camming mouth after their axial movement through a measured distance.

4. The method of claim 2, including providing fluid under pressure behind a piston as the first force, said piston being operatively associated with the camming mouth to drive it toward the ferrule.

5. The method of claim 4, including terminating the relative movement of the ferrule and camming mouth after their axial movement through a measured distance.

6. The method of claim 1, including terminating the relative movement of the ferrule and camming mouth after their axial movement through a measured distance.

7. The method of claim 1, including,
   providing a fluid pump and connecting it in fluid communication with the interior of said tool to serve as the means for applying the first and second forces.

8. The method of claim 7, including sequentially
   c operating valve means to direct fluid from the pump in a path to apply the first force,
   d changing the setting of the valve means to maintain the first force and
   e again changing the setting of the valve means to direct fluid from the pump in a different path to apply the second force.

* * * * *